UNITED STATES PATENT OFFICE.

ALEXANDER BACKHAUS, OF KÖNIGSBERG, GERMANY.

PREPARING COWS' MILK FOR INFANTS.

SPECIFICATION forming part of Letters Patent No. 597,378, dated January 18, 1898.

Application filed October 5, 1897. Serial No. 654,471. (No specimens.) Patented in Germany April 2, 1896, No. 92,246; in France July 17, 1896, No. 258,142; in England July 17, 1896, No. 16,016, and in Belgium May 13, 1897, No. 128,245.

*To all whom it may concern:*

Be it known that I, ALEXANDER BACKHAUS, doctor of philosophy and professor of agriculture, a subject of the Grand Duke of Hesse, residing at Königsberg, in the Province and Kingdom of Prussia, German Empire, have invented a new and useful Process of Treating Cows' Milk, (for which I have obtained patents in Germany, No. 92,246, bearing date April 2, 1896; in France, No. 258,142, bearing date July 17, 1896; in Great Britain, No. 16,016, bearing date July 17, 1896, and in Belgium, No. 128,245, bearing date May 13, 1897;) and I do hereby declare that the following is a full, clear, and exact description of the invention, which will enable others skilled in the art to which it appertains to make and use the same.

The present invention relates to the preparation of a food for children, especially nurse-children, from the milk of cows and other domesticated animals, and has for its object to produce a food in which the nutritive matters—*i. e.*, soluble albumen, casein, fat, and milk-sugar—are present in the like proportions as in human milk.

For the purpose above stated my invention essentially consists in so treating the skim-milk of cows and other domesticated animals with appropriate agents, such as ferments, that a certain portion of the casein present in the skim-milk is transformed into soluble albumen and the remainder thrown down and furnishing the filtered-off liquor or serum with casein, fat, and milk-sugar, so as to obtain as the final product a food in which soluble albumen, casein, fat, and milk-sugar are present in the proportions peculiar to human milk, as fully hereinafter stated.

The percentage of fat and milk-sugar of the cow-milk of water, respectively cream and milk-sugar, can easily be varied at will by the addition to said milk of water, respectively cream and milk-sugar; but it has not hitherto been possible to so vary the percentage of albumens contained in the cow-milk as to be in harmony with that present in the human milk.

The following tabula shows the differences which exist between cow-milk and human milk as regards the albumens:

| | Cow-milk. Per cent. | Human milk. Per cent. |
|---|---|---|
| Dissolved albumens or albumen | 0.5 | 1.25 |
| Swelled albumens or casein | 3.0 | 0.50 |
| Relation between both kinds of albumens | 1:6 | 1:0.4 |

As known, the casein can be removed from the milk by coagulating it through the agency of rennet or an acid; but by applying those agents a liquor results which contains the small percentage of soluble albumen only, which is original to the cow-milk. On the other hand, it is possible to establish the low percentage of albumens as present in the human body by the addition of water to the cow-milk; but by so proceeding the relation between the proportions of dissolved and swelled albumens—*i. e.*, of albumen and casein—is left unaltered—that is to say, the resulting liquor contains too little of the former and too much of the latter. Moreover, the addition of water to the milk has the effect of lowering the percentages of fat and milk-sugar, so that the proper relation has to be reëstablished artificially, whereby the process is notably complicated and the production rendered costly.

In the course of my investigations I have recognized conditions under which any desired percentage of the casein present allows to be converted into soluble albumen within the milk and the remainder of the casein subsequently thrown down from the liquid or serum. This I obtain by subjecting the casein to the actions of two ferments in succession, of which one is capable of converting casein into souble albumen—such as trypsin, papayotin, and the like—and the other of coagulating casein, such as rennet, the two agents being by preference simultaneously added to the milk, so that the precipitating one is caused to enter into action the very moment the action of the converting one has resulted in the production of the required proportion of soluble albumen. This procedure at first appeared to be impracticable for the reason that the converting action of trypsin upon casein is bound to the presence of an alkali, and the latter counteracts the coagulating power of the rennet. Now my experiments have resulted in laying open that the said counteracting influence of the alkali is not an absolute one, but that when only a feeble alkalinity is given to the milk—such as obtained by the addition to the latter of 0.2 to 0.5 pro mille of sodium carbonate—the action of the rennet is not prevented, but only retarded for some time, and that such feeble alkalinity suffices for allowing the trypsin to efficiently manifest its transforming power, so that after a proportion of the casein (dependent upon the proportion of the trypsin used) has been converted into soluble albumen the remainder of it is caused to separate out and can be removed, leaving a liquor containing the desired proportion of soluble albumen.

In carrying my invention into practice I proceed as follows: I first take a quantity of skim-milk, and after having added the soda I state the power of the rennet to be employed, the milk being treated up to about 40° centigrade, (incubation temperature.) According to the result obtained I determine by way of calculation what proportion of rennet is necessary for causing coagulation to take place after the lapse of half an hour or about, which I have proved most convenient, as a longer lapse of time favors a large production of bacteria. Then I determine by experiment and calculation what proportion of the trypsin to be disposed of is required for converting 0.75 per cent. of the casein present into soluble albumen during the said lapse of half an hour, the milk being likewise warmed up to 40° centigrade. Having thus determined the necessary proportions of the ferments, I proceed to operate upon the bulk of cow-milk to be treated. I first separate the same while it is as fresh as possible into cream and skim-milk, which may be done by means of any known description of centrifugal apparatus known for that purpose. The skim-milk is heated up to about 40° centigrade and furnished with the quantities of sodium carbonate, trypsin, and rennet calculated as stated. The said agents may be added before or after or during the time the milk is raised to the said temperature of 40° centigrade, and at a time or at first the sodium carbonate and subsequently the two others together or one after the other without notable interval. As the rennet as well as the trypsin can be prepared in the form of a powder, I prefer to use them under that form to mix both together with the powdered sodium carbonate and to add as much of this mixture as is required. Moreover, I prefer to employ trypsin, prepared after the well-known prescription of Kühne and Hammarsten, because of its efficiency. The milk having been maintained at 40° centigrade for half an hour, the liquor or serum contains the desired proportion of 1.25 per cent. of dissolved albumen—i. e., the proportion in which the latter is present in the human milk. Now the rennet enters into action, throwing down all of the not-transformed casein. After coagulation is accomplished the temperature of the liquor is raised up to from 70° to 80° centigrade, whereby both the ferments are rendered inoffensive, when the coagulated casein is removed from the liquor or serum by filtering. Finally the serum is mixed with cream and milk-sugar in such proportions as required for establishing the percentage of fat, casein, and milk-sugar present in the human milk—that is to say, one per cent. of milk-sugar and so much cream that by means of the latter 0.5 per cent. of casein is reintroduced. The cream is taken from the bulk of cream obtained in the preparation of skim-milk. The remainder of cream I prefer to utilize for the preparation of a food suitable for older children by mixing the same with skim-milk, water, and milk-sugar. For instance, one part of the cream is mixed with one part of skim-milk and one part of water and to this mixture is added two per cent. of milk-sugar. In both cases the final product should be subjected to the process of sterilization.

I claim as my invention—

1. The process which consists in separating cows' milk into cream and skim-milk, providing the skim-milk with a feeble alkalinity, subjecting it to the combined action of ferments, one of which is capable of transforming casein into soluble albumen and the other capable of separating out the remainder of casein, rendering the ferments inactive after coagulation, removing the coagulate from the serum and mixing the latter with cream and milk-sugar, substantially as and for the purpose stated.

2. The process which consists in separating cows' milk into cream and skim-milk, adding to the latter sodium carbonate, trypsin and rennet in proportions as stated, allowing the ferments to act at incubation temperature, killing the ferments by raising the temperature after coagulation, separating the coagulated remainder of casein from the serum, and mixing the latter with cream and milk-sugar, as and for the purpose stated.

3. The method of transforming skim-milk into milk serum having a higher percentage of soluble albumen than the former, which consists in subjecting the skim-milk to the combined action of trypsin and rennet, substantially as described.

In testimony whereof I have hereunto set my hand in the presence of two subscribing witnesses.

ALEXANDER BACKHAUS.

Witnesses:
CARL KNOPP,
WERNER BLÄDEL.